United States Patent Office 2,818,441
Patented Dec. 31, 1957

2,818,441

PROCESS FOR EFFECTING FREE RADICAL REACTIONS INVOLVING ABSTRACTION OF HYDROGEN BY VAPORIZED HYDROGEN PEROXIDE

William E. Vaughan, Berkeley, Frederick F. Rust, Orinda, and Edward R. Bell, Concord, Calif., assignors to Shell Development Company, New York, N. Y., a corporation of Delaware No Drawing. Application September 13, 1954
Serial No. 455,756

16 Claims. (Cl. 260—632)

This invention relates to a new process for effecting chemical reactions. More particularly, the invention relates to a new process for effecting free radical reactions involving the abstraction of hydrogen.

Specifically, the invention provides a new and efficient process for effecting free radical reactions involving the abstraction of hydrogen from materials containing labile hydrogen, such as, for example, dehydrogenation reactions, dehydrodimerization or dehydropolymerization reactions and various oxidation reactions. This type of reaction is accomplished according to the present invention by heating the material containing the labile hydrogen atom with vaporized hydrogen peroxide at a temperature above 400° C. for a short period, and then recovering the desired product from the reaction mixture.

As a special embodiment, the invention provides a method for effecting dehydrodimerization and dehydropolymerization reactions wherein hydrogen is abstracted from a reactant and the resulting radicals subsequently combine to form a dimer or polymer. This method comprises heating the reactant containing the labile hydrogen atom, such as, for example, propylene or isobutylene, with vaporized hydrogen peroxide at a temperature above 400° C., and preferably between about 400° C. and about 650° C., for a short residence period, and then recovering the desired dimer or polymer from the resulting mixture.

It is an object of the present invention to provide a new and improved method for effecting free radical reactions involving the abstraction of hydrogen. It is a further object to provide a novel method for effecting free radical reactions involving the abstraction of hydrogen that is more economical and generally more efficient than those employed heretofore. It is a further object to provide a method for effecting reactions involving the abstraction of hydrogen that can be accomplished without the use of any special catalytic material. It is a further object to provide a new method for effecting dehydrogenation reactions. It is a further object to provide a new method for effecting dehydrodimerization and dehydropolymerization reactions. It is a further object to provide a method for conducting various oxidation reactions. It is still a further object to provide a new method for preparing dimers such as diallylic compounds from monomeric compounds. It is a further object to provide a method for preparing liquid fuels from short chain hydrocarbons, such as propane and propylene. It is still a further object to provide a method for converting hydrocarbons into alcohols. Other objects and advantages of the invention will be apparent from the following detailed description thereof.

It has now been discovered that these and other objects may be accomplished by the process of the invention which comprises heating a material containing a labile hydrogen with vaporized hydrogen peroxide at a temperature above 400° C. for a short period, and then recovering the desired product from the reaction mixture.

The process of the invention is based on the unexpected discovery that when vaporized hydrogen peroxide is heated to temperatures above 400° C. free radicals are formed, and, if the pyrolysis is conducted in the presence of a material containing a labile hydrogen atom, the formed free radicals abstract a hydrogen atom from that material. The free radicals formed by the abstraction of hydrogen then undergo further reaction to yield dehydrogenated products, dehydrodimerized or dehydropolymerized products, oxidation products, and the like, and mixtures thereof depending upon the nature of the starting material and the exact reaction conditions employed.

Suggested mechanism for reactions involved in producing dehydrogenated products by the process of the invention may be exemplified by the following equations showing the preparation of allene from propylene and $H_2O_2$:

(1) $H_2O_2 \rightarrow 2HO\cdot$ (2) 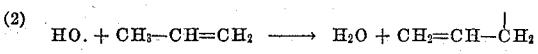
$$HO\cdot + CH_3-CH=CH_2 \longrightarrow H_2O + CH_2=CH-\overset{|}{C}H_2$$

(3) 
$$CH_2=CH-\overset{|}{C}H_2 + HO\cdot \longrightarrow CH_2=C=CH_2 + H_2O$$

Suggested mechanisms for reactions involved in the formation of dehydrodimerization products by the process of the invention may be exemplified by the following equation showing the preparation of diallyl from propylene + $H_2O_2$:

(1) $H_2O_2 \rightarrow 2HO\cdot$ (2) 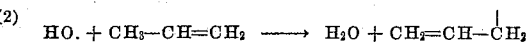
$$HO\cdot + CH_3-CH=CH_2 \longrightarrow H_2O + CH_2=CH-\overset{|}{C}H_2$$

(3) 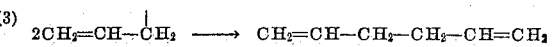
$$2CH_2=CH-\overset{|}{C}H_2 \longrightarrow CH_2=CH-CH_2-CH_2-CH=CH_2$$

Suggested mechanism reactions involved in the formation of oxidation products by the process of the invention may be exemplified by the following equation showing the preparation of allyl alcohol from propylene + $H_2O_2$:

(1) $H_2O_2 \rightarrow 2HO\cdot$ (2) 
$$HO\cdot + CH_3-CH=CH_2 \longrightarrow H_2O + CH_2=CH-\overset{|}{C}H_2$$

(3) 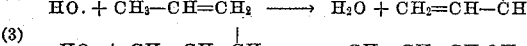
$$HO\cdot + CH_2=CH-\overset{|}{C}H_2 \longrightarrow CH_2=CH-CH_2OH$$

These and other reactions may occur simultaneously during the process of the invention. Conditions may be varied so as to promote one type of reaction over the other types of reactions.

The above-described process of the invention is to be distinguished from processes for producing hydrogen peroxide wherein materials such as propane are heated with molecular $O_2$. In that case, large quantities of molecular oxygen are present and the products obtained are quite different from those obtained in the present case. The present process is conducted in absence of substantial quantities of molecular oxygen.

The materials employed in the process of the invention may be any organic material having at least one labile hydrogen atom. The material should of course not be one that is destroyed, i. e., converted to carbon or other products, not free radicals, when exposed to temperatures above 400° C. As to the labile hydrogen, the materials are preferably those which when treated photochemically, i. e., in the presence of actinic radiation, with chlorine liberate hydrogen chloride. These materials may be saturated or unsaturated, aliphatic, cycloaliphatic aromatic or heterocyclic. They may also be substituted with various substituents, such as halogen atoms, alkoxy radicals, carboxyl groups and the like. Examples of these materials include, among others, benzene, toluene, ethyl benzene, xylene, isopropylbenzene, butylbenzene, cyclohexane, cyclopentane, methylcyclohexane, dimethylcyclopentane, methylcyclohexene, ethylene, butylene, isobutylene, propylene, pentene-1, octene-1, pyridine, dodecene-2, phenol, acetic acid, propionic acid, benzyl cyanide, dodecyl nitrile, p-methoxy-n-propylbenzene, 3-phenyl-2-propene, 2,4,4-trimethyl-2-pentene, 3-cyclohexyl-2-propene and styrene.

Preferred materials to be used in the process comprise the hydrocarbons containing a labile hydrogen atom. Particularly preferred members of this group include the mono-nuclear aromatic hydrocarbons and particularly the unsubstituted aromatic hydrocarbons and alkyl-substituted aromatic hydrocarbons containing no more than 15 carbon atoms, such as, for example, benzene, toluene, isopropylbenzene, butylbenzene, and the like; the cycloaliphatic hydrocarbons and particularly the unsubstituted cycloaliphatic hydrocarbons and alkyl-substituted cycloaliphatic hydrocarbons containing no more than 12 carbon atoms, such as, for example, cyclohexane, cyclohexene, methylcyclohexane, 3-methylcyclohexane, and the like; and the open-chain aliphatic hydrocarbons containing no more than 10 carbon atoms, such as, for example, ethylene, propylene, isobutylene, propane, pentane, hexane, octane, decane, 2,4,4-trimethylpentane, and the like.

Particularly preferred materials, especially if one desires dimeric or polymeric products are the unsubstituted aromatic hydrocarbons and alkyl-substituted aromatic hydrocarbons, the unsubstituted cycloaliphatic hydrocarbons and alkyl-substituted aromatic hydrocarbons, and the ethylenically unsaturated aliphatic and cycloaliphatic hydrocarbons.

Of particular value in the preparation of dimers are the monoallylic compounds, i. e., compounds which possess a double bond between 2 aliphatic carbon atoms, one of which is joined to an aliphatic carbon atom bearing a replaceable hydrogen atom, such as, for example, propylene, isobutylene, 2-chloro-2-propene, 3-phenyl-2-propene, 3 - methyl - 2 - pentene, 5-methyloctene-1, 3-cyclohexyl-2-octene, 5-chlorooctene-1, 3-chloro-2-hexene, 6-ethyldodecene-1 and the like. Especially preferred monoallylic compounds are those of the formula:

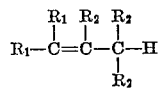

wherein $R_1$ is a member of the group consisting of hydrogen, chlorine, tertiary alkyl radicals, aryl and aralkyl radicals, $R_2$ is a member of the group consisting of hydrogen, chlorine, alkyl, aryl and aralkyl radicals, and the total molecule contains no more than 15 carbon atoms, and particularly no more than 10 carbon atoms.

Coming under special consideration, particularly because of the ease of operation and high yields of product obtained therewith are the organic compounds described above having a labile hydrogen atom with a bond energy of less than 90 kg. calories, and preferably less than 85 kg. calories. Also of special interest are those compounds that form free radicals that can be stabilized by resonance, such as, for example, propylene and isobutylene.

In the operation of the process of the invention, any one or more of the above-described materials are heated with vaporized hydrogen peroxide at a temperature above 400° C. The vaporized hydrogen peroxide used in the process may be prepared by a variety of suitable methods. It may be obtained, for example, by spraying an aqueous solution of the hydrogen peroxide, say of, for example, 8% to 60% concentration, into a hot gas or more preferably by allowing a solution of the hydrogen peroxide to flow as a fine film over a heated surface. The vaporization is preferably accomplished at temperatures ranging from about 100° C. to 180° C. The lower temperatures are preferably employed when the hydrogen peroxide solution is sprayed or flowed at the slower rates, while the higher temperatures are employed when the solution is sprayed or flowed at faster rates.

The material containing the labile hydrogen atom and the vaporized hydrogen peroxide may be added separately to the reaction zone or they may be premixed before being introduced to the reaction zone. If the components are added separately, one or both of the reactants may be added at a plurality of points throughout the reaction zone. To insure a thorough intermixing of the components, however, it is generally preferred to mix the components before introducing them into the reaction zone. It is also advantageous to preheat the materials before they are introduced into the reaction zone. Such preheating is preferably accomplished at temperatures ranging from about 100° C. to 200° C. A preferred operation comprises passing the reactant containing the labile hydrogen atom along with the hydrogen peroxide solution during the vaporization step and thereby effecting a premixing and preheating of the two components together before they are introduced into the reaction zone.

The reactant containing the labile hydrogen atom and the hydrogen peroxide should be combined so as to have the reactant having the labile hydrogen atom in a molar excess of at least two-fold. In general, the reactant containing the labile hydrogen atom and the hydrogen peroxide will be combined in molar ratios varying from 5:1 to 70:1. Preferred ratios vary from 11:1 to 50:1. At temperatures above about 450° C., it is generally preferred to employ ratios above about 11:1 for safety reasons.

Temperatures used in the reaction zone should be above 400° C., and in general, below about 750° C. The exact temperature employed in each case is preferably adjusted to the nature of the reactant containing the labile hydrogen atom, residence period and product to be desired and can best be determined for each case by a few routine determinations. Preferred temperatures range from about 400° C. to about 650° C. and more preferably from about 450° C. to about 650° C.

Atmospheric, superatmospheric or subatmospheric pressures may be used as desired. While the use of superatmospheric pressures may be desirable in some instances, the process is more conveniently executed at or near atmospheric pressure.

The residence period for the reaction will depend on the desired degree of conversion of the hydrogen peroxide and this in turn will depend on the temperature selected but will usually be not more than 60 seconds. The results are usually better when quite a large portion, say from 60% to 100% and more preferably from 70% to 90% of the hydrogen peroxide is decomposed per pass, and the conditions are generally adjusted to effect this type of conversion. At temperatures ranging from 400° C. to 750° C., the desired decomposition per pass is generally obtained in residence periods ranging from 0.01 second to 30 or 50 seconds. At temperatures ranging from about 400° C. to about 500° C., the desired decomposition per pass is generally obtained in from about 10 to about 30 seconds, and at the higher temperatures, e. g., from about 500° C. to about 750° C., the desired decomposition is obtained in from 0.01 to about 10 seconds.

As indicated above, the effluent from the reaction zone in most cases will contain a variety of products, such as may be produced by the dehydrogenation, dehydrodimerization and dehydropolymerization and oxidation reactions and the like, that occur in the reaction zone. The effluent obtained by treating propylene with hydrogen peroxide will contain, for example, dehydrogenation products, such as allene and ethylene, dimer and polymerization products, such as diallyl $C_5$ up to $C_9$ hydrocarbons, and dehydrohydroxylation products, (oxidation products) such as allyl alcohol, propanol, 1,2-dihydroxypropane and related products as acrolein and the like. These products may be recovered from the effluent of the reaction zone by cooling and condensing the effluent and then treating the resulting organic mixture by known procedures so as to remove the desired product or groups of products. The lower boiling liquid products, such as allyl alcohol, acrolein, propanol, butadiene, diallyl, and the $C_5$ to $C_9$ cuts may be removed generally by fractional distillation, while some of the higher boiling products as obtained from the use of aromatic reactants may be recovered as bottoms products.

As indicated above, the process of the invention is particularly suited for use in effecting dimerization or coupling reactions. Any of the materials containing the labile hydrogen atom may be used in this reaction, but the preferred reactants to be employed are the unsubstituted aromatic hydrocarbons and alkyl-substituted aromatic hydrocarbons, such as, for example, benzene, toluene, isopropylbenzene, and ethylbenzene; the cycloaliphatic hydrocarbons and alkyl-substituted cycloaliphatic hydrocarbons, such as, for example, cyclohexane, methyl cyclohexane, isobutylcyclohexane and amyl cyclohexane; and the ethylenically unsaturated aliphatic and cycloaliphatic hydrocarbons, such as, for example, propylene, isobutylene, cyclohexene, hexene-1, heptene-1 and octene-1. Of special value in the formation of dimers are the monoallylic compounds having the above-described formula.

If one employs a single material having the labile hydrogen as the reactant, the product will be a symmetrical dimer, while if a mixture of two different materials are employed as reactants, the product will include unsymmetrical dimers. If the material employed as reactant has two or more replaceable hydrogens, the product may also include polymeric materials having a degree of polymerization greater than 2.

The yield of the dimer products is increased by using larger amounts of the reactant containing the labile hydrogen atom and it is preferred to use the reactant containing the labile hydrogen atom and the hydrogen peroxide in molar ratios of at least 4:1. Little increase in yield is obtained after the ratio has been increased above about 11:1, but, as indicated above, ratios above this are used in many cases for safety reasons.

The yield of the dimer products is also increased by employing higher reaction temperatures and shorter residence periods. Higher temperatures by themselves usually give smaller yields of the dimer product. Preferred temperatures range from about 450° C. to about 650° C. with contact times varying preferably from 0.1 to about 25 seconds. The best combination of temperature and residence time may be easily determined for each individual case by a few routine determinations.

The process of the invention may be accomplished in a batch, semi-continuous or continuous manner. For large scale operations, it is generally preferred to employ a continuous recycle system wherein the reactant containing the labile hydrogen atom and the hydrogen peroxide are continuously introduced into the evaporator or reactor, the desired product continuously removed from the effluent coming from the reaction zone and the unreacted reactant removed from the higher boiling components and recycled back to the evaporator or reactor.

The apparatus used in the above-described process of the invention may be of any suitable construction as long as it provides means for introducing the reactants, means for maintaining the desired high temperatures and means for cooling the reaction mixture and recovering the desired product. Reaction tubes made of glass, aluminum or stainless steel are especially suitable. It is also preferred to employ reactors having a surface-to-volume ratio of less than 0.4 cm.$^{-1}$. In some cases, it may also be desirable to coat the inside surface of the reactor with boric acid.

The products produced by the above process may be used for a great many applications in industry. The unsaturated products such as allene, butadiene and diallyl and dimethallyl, may be used for example, in the preparation of valuable resins and polymers. Diallyl is particularly useful in the preparation of fibers and filaments. The $C_5$ and higher cuts, such as produced from the use of alkenes or alkanes, are particularly useful as liquid fuels.

To illustrate the manner in which the invention may be carried out, the following examples are cited. It should be understood, however, that the examples are for the purpose of illustration and they should not be regarded as limiting the invention in any way.

The vaporized hydrogen peroxide used in the following example was prepared by feeding a 30% aqueous hydrogen peroxide solution at the top of the evaporator onto a vertically descending spiral glass rod sealed on the inner wall of a glass tube. The wall of the tube was heated by means of a flexible tape heater to about 100° C., for low peroxide flow rates (e. g., .3 to 1.5 grams/min.) and about 180° C., for high peroxide flow rates (2.0 grams/min.).

The reactant taking part in the reaction was fed into the evaporator and premixed with the vaporized hydrogen peroxide before being introduced into the reactor.

The reactor employed in the examples was a glass tube sealed directly on the evaporator and heated by a furnace.

The product collection system consisted of a water condenser followed by a trap at 0° C., and then a series of traps at —80° C., followed by gas collection over brine.

*Example I*

This example illustrates the operation of the process of the invention using benzene as the reactant and recovering diphenyl as the chief product.

Benzene and vaporized hydrogen peroxide were premixed in a ratio of 10:1 at a temperature of about 180° C., and then fed into the reactor which was maintained at 460° C. The residence period in the reactor was 16 sec. The effluent vapors were removed at the bottom and cooled. The collected organic material was then distilled to remove diphenyl in 37.6% yield.

*Example II*

This example illustrates the operation of the process of the invention using propylene as the reactant and recovering diallyl as the chief product.

Propylene and vaporized hydrogen peroxide were premixed in a ratio of 21.6:1 at a temperature of about 180° C. and then fed into the reactor which was maintained at 530° C. The residence period in the reactor was 9 seconds. The effluent vapors were removed at the bottom and cooled. The collected material was distilled to yield diallyl in 21% yield. Other products recovered include ethylene, allene, a $C_6$ cut (other than diallyl) including benzene, a $C_5$ cut, a $C_9$ cut, acrolein, a saturated alcohol and an alpha glycol.

The $C_5$ to $C_9$ cuts produced above are useful as liquid fuels.

*Example III*

A series of experiments patterned after that disclosed in the preceding example on the preparation of diallyl from propylene was conducted with the exception that the feed ratio was allowed to vary. The residence time was controlled so as to keep the $H_2O_2$ conversion between 85–99%. As indicated in the table, the yield increases with the feed ratios up to a ratio of about 11:1 and after that little if any increase in yield is obtained by increasing the feed ratio.

| Feed Ratio, Moles $C_3H_6$/moles $H_2O_2$ | Temperature, °C. | Diallyl Yield, Moles $C_6H_{10}$/100 moles $H_2O_2$ Converted |
| --- | --- | --- |
| 3.6 | 402 | 2.5 |
| 12.0 | 433 | 12.1 |
| 11.0 | 506 | 18.4 |
| 50.0 | 495 | 18.9 |

Example IV

A series of experiments patterned after that disclosed in Example II on the preparation of diallyl from propylene was conducted with the exception that the contact time was allowed to vary. As indicated in the table below, yield increased with a decrease in contact time.

| Ratio of Propylene H₂O₂ | Temperature, °C. | Contact Time, Sec. | Diallyl Yield, Moles C₆H₁₀/ 100 moles H₂O₂ Converted |
|---|---|---|---|
| 21:1 | 530 | 9 | 21.8 |
| 21:1 | 540 | 5 | 23.1 |
| 21:1 | 530 | 1 | 27.6 |

Example V

A series of experiments patterned after that disclosed in Example II on the preparation of diallyl from propylene was conducted with the exception that the temperature was allowed to vary. As indicated in the table below, increase in temperature increased the yield as long as the contact time was decreased.

| Ratio of Propylene H₂O₂ | Temperature, °C. | Contact Time, Sec. | Diallyl Yield, Moles C₆H₁₀/ 100 moles H₂O₂ Converted |
|---|---|---|---|
| 20:1 | 433 | 25 | 12.1 |
| 20:1 | 506 | 18 | 18.4 |
| 20:1 | 530 | 1 | 27.6 |
| 20:1 | 630 | 0.1 | 31.2 |

Example VI

This example illustrates the preparation of diallyl from propylene and hydrogen peroxide under recycle conditions.

Propylene and vaporized hydrogen peroxide were premixed in a ratio of 50:1 and continuously fed into the reactor which was maintained at 518° C. The residence period in the reactor was about 5 seconds. The effluent vapors were removed, cooled, the propylene separated and recycled and mixed with make-up propylene and hydrogen peroxide to maintain the above feed ratio. The yield of diallyl in this case was about 24%.

Example VII

This example illustrates the operation of the process of the invention using isobutylene as the reactant and recovering dimethallyl as the chief product.

Isobutylene and vaporized hydrogen peroxide were premixed in a ratio of 19:1 at a temperature of about 180° C., and then fed into the reactor which was maintained at 530° C. The residence period in the reactor was 9 seconds. The effluent vapors were removed at the bottom and cooled. The collected organic material was then distilled to yield dimethallyl in 36.6% yield. Other products identified include ethylene, allene, propylene, a C₅ cut, a C₆ cut, a C₇ cut, a C₈ cut (other than dimethallyl), a saturated alcohol, saturated aldehyde, methacrolein and an alpha glycol.

Example VIII

This example illustrates the operation of the process of the invention using toluene as the reactant and recovering dibenzyl as the chief product.

Toluene and vaporized hydrogen peroxide were premixed in a ratio of 6.25:1 at a temperature of about 180° C., and then fed into the reactor which is maintained at 540° C. The residence period in the reactor is 3.2 secs. The effluent vapors were removed at the bottom and cooled. The collected organic material was then distilled to remove the dibenzyl in 37% yield.

Example IX

This example illustrates the preparation of butadiene from ethylene and hydrogen peroxide.

Ethylene and vaporized hydrogen peroxide were premixed in a ratio of 20:1 at a temperature of about 180° C. and then fed into the reactor which was maintained at 525° C. The residence period in the reactor was 10 seconds. The effluent vapors were removed and cooled. Butadiene as well as acetylene and propylene were recovered as products.

Example X

Propane and vaporized hydrogen peroxide were premixed in a ratio of 16.5:1 and then fed into the reactor which was maintained at 535° C. The residence period in the reactor was 11.5 seconds. The effluent vapors were removed and cooled. Propylene and ethylene were recovered as products.

Example XI

This example illustrates the operation of the process of the invention using cyclohexane as the reactant and recovering as desired products cyclohexanol and cyclohexanone.

Cyclohexane and vaporized hydrogen peroxide were premixed in a ratio of 12:1 at a temperature of about 180° C., and then fed into the reactor which is maintained at 460° C. The residence period in the reactor was 10.5 sec. The effluent vapors were removed at the bottom and cooled. The collected organic material was then distilled to remove cyclohexanol and cyclohexanone.

Example XII

This example illustrates the operation of the process of the invention using acetic acid as the reactant and recovering succinic acid as the desired product.

Acetic acid and vaporized hydrogen peroxide were premixed in a ratio of 63.1 at a temperature of about 180° C. and then fed into the reactor which is maintained at 460° C. The residence period in the reactor was 12.5 sec. The effluent vapors were removed at the bottom and cooled. The collected organic material was then distilled to remove the desired succinic acid.

Example XIII

This example illustrates the operation of the process of the invention using phenol as the reactant and recovering a high molecular weight polyphenol as the desired product.

Phenol and vaporized hydrogen peroxide were premixed in a ratio of 4:1 at a temperature of about 180° C. and then fed into the reactor which is maintained at 480° C. The residence period in the reactor is 8 sec. The effluent vapors were removed at the bottom and cooled. The collected organic material was then distilled. The bottoms product was identified as a high molecular weight polyphenol.

We claim as our invention:

1. A process which comprises heating a mixture consisting essentially of vaporized hydrogen peroxide and a molar excess of at least two-fold with respect to the hydrogen peroxide of organic compound which is not decomposed to carbon by heat at a temperature in the range of 400° C. to about 750° C. and which, when treated with chlorine in the presence of actinic light, liberates hydrogen chloride, at a temperature above 400° C. but below about 750° C. for a period of from 0.01 second to 60 seconds and then recovering the products of the reaction.

2. A process as in claim 1 wherein the mole ratio of said organic compound to hydrogen peroxide in said mixture is 5:1 to 70:1 and the heating is accomplished at a temperature between about 400° C. and about 650° C.

3. A process for conducting a dehydrogenation reaction involving the abstraction of a hydrogen atom from an organic compound which is not decomposed to carbon by heat at a temperature in the range of 400° C. to about 750° C. and which liberates hydrogen chloride when treated with chlorine in the presence of actinic light, which comprises heating a mixture consisting essentially of said organic compound and vaporized hydrogen peroxide in a mole ratio of 5 to 70 moles of said organic compound per mole of hydrogen peroxide at a temperature between 400° C. and about 750° C. for a period of 0.01 to 50 seconds, and recovering the dehydrogenation product of the reaction.

4. A process for conducting an oxidation reaction involving the abstraction of one or more hydrogen atoms per molecule and replacement thereof with hydroxyl to form alcohol, which comprises heating a mixture consisting essentially of vaporized hydrogen peroxide and a molar excess of at least two-fold with respect to the hydrogen peroxide of hydrocarbon which is not decomposed to carbon by heat at a temperature in the range of 400° to about 750° C. and which, when treated with chlorine in the presence of actinic light, liberates hydrogen chloride, at a temperature between 400° C. and about 750° C. for a period varying from 0.01 to 50 seconds and recovering the alcohol product from the reaction mixture.

5. A process for preparing liquid hydrocarbons suitable for use as fuels from lower hydrocarbons which do not decompose to carbon by heat at between 400° C. and about 650° C. and which liberate hydrogen chloride when treated with chlorine in the presence of actinic light, which comprises heating a mixture consisting essentially of said hydrocarbon and vaporized hydrogen peroxide in a ratio of 5 to 70 moles of said hydrocarbon per mole of hydrogen peroxide at a temperature between 400° C. and about 650° C. for a period from 0.01 second to 60 seconds, and then recovering the formed higher liquid hydrocarbons from the reaction mixture.

6. A process for conducting a dehydrodimerization reaction which comprises heating a mixture consisting essentially of vaporized hydrogen peroxide and a hydrocarbon which is not decomposed to carbon by heat at a temperature in the range of 400° C. to about 750° C. and which liberates hydrogen chloride when treated with chlorine in the presence of actinic light in a ratio of 5 to 70 moles of said hydrocarbon per mole of hydrogen peroxide at a temperature between 400° C. and 650° C. for a period between 0.01 second and 60 seconds, and then recovering the formed dimer product from the reaction mixture.

7. A process as in claim 6 wherein the hydrocarbon reactant is benzene and the dimer recovered is diphenyl.

8. A process as in claim 6 wherein the hydrocarbon reactant is a monoallylic hydrocarbon and the dimer recovered is a diallylic compound.

9. A process for conducting a dehydrodimerization reaction which comprises heating a mixture consisting essentially of organic compound which is not decomposed to carbon by heat at a temperature in the range of 400° C. to about 750° C. and which liberates hydrogen chloride when treated with chlorine in the presence of actinic light and vaporized hydrogen peroxide at a temperature between 400° C. and 650° C. for 0.01 second to 50 seconds, said organic compound and hydrogen peroxide being combined in a mole ratio varying from 4 to 70 moles of said organic compound per mole of hydrogen peroxide, and then recovering the formed dimeric product from the reaction mixture by distillation.

10. A process for preparing a dialkene which comprises heating a mixture consisting essentially of alkene and vaporized hydrogen peroxide in a ratio in the range of 11 to 50 moles of alkene per mole of hydrogen peroxide at a temperature between 400° C. and 650° C. for a period varying from 0.01 second to 30 seconds, and then recovering the resulting dialkene compound from the resulting mixture.

11. A process as in claim 10 wherein the alkene is propylene and the product recovered is diallyl.

12. A process as in claim 10 wherein the alkene is isobutylene and the product recovered is dimethallyl.

13. A process as in claim 10 wherein the alkene is ethylene and the product recovered is butadiene.

14. A process for preparing a diallylic hydrocarbon which comprises vaporizing hydrogen peroxide, mixing an alkene which is stable at a temperature of 400° C. to 650° C. and has a hydrogen atom attached to a carbon atom directly linked to one of the carbon atoms of the ethylenic group with the vaporized hydrogen peroxide to form a mixture consisting essentially of alkene and hydrogen peroxide in a ratio of 4 to 70 moles of alkene per mole of hydrogen peroxide, heating said mixture at between 400° C. and in a mole ratio varying from 650° C., for a period varying from 0.01 second to 50 seconds, recovering the unreacted alkene and recycling it back to be mixed with the vaporized hydrogen peroxide, and then recovering the formed diallylic compound.

15. A process as in claim 14 wherein the alkene is propylene.

16. A process as in claim 14 wherein the hydrogen peroxide is vaporized by passing a solution of the hydrogen peroxide as a thin film over a heated surface.

References Cited in the file of this patent

UNITED STATES PATENTS

| | | |
|---|---|---|
| 2,376,257 | Lacomble | May 15, 1945 |
| 2,461,988 | Kooijman | Feb. 15, 1949 |
| 2,689,253 | Robertson et al. | Sept. 14, 1954 |
| 2,730,559 | Porter et al. | Jan. 10, 1956 |
| 2,755,322 | Rust et al. | July 17, 1956 |
| 2,757,192 | Jenner | July 31, 1956 |

OTHER REFERENCES

Milas et al., J. A. C. S., vol. 71 (1949), pp. 1448–50.
McLane J. Chem. Phys., vol. 17 (1949), 379–85.
Fuson: Advanced Organic Chemistry (1950); Wiley & Sons, N. Y.; pages 413–15.
Groggins: Unit Processes (4th edit.) McGraw-Hill, N. Y., 1952, pp. 455, 464, 714, 715.
Groggins: (loc. cit.) chapter VII.
Schumb et al.: "Hydrogen Peroxide" (Monograph 128), Reinhold, N. Y., 1955; pp. 361–3, 378–9, 447–66.